(No Model.)

E. L. BRACKEN.
HARVESTING MACHINE.

No. 268,993. Patented Dec. 12, 1882.

WITNESSES:
C. Neveux
C. Sedgwick

INVENTOR:
E. L. Bracken
BY Munn & Co.
ATTORNEYS.

UNITED STATES PATENT OFFICE.

EDSON L. BRACKEN, OF DAWSON, ILLINOIS.

HARVESTING-MACHINE.

SPECIFICATION forming part of Letters Patent No. 268,993, dated December 12, 1882.

Application filed April 6, 1882. (No model.)

*To all whom it may concern:*

Be it known that I, EDSON L. BRACKEN, of Dawson, in the county of Sangamon and State of Illinois, have invented certain new and useful Improvements in Harvesting and Binding Machines, of which the following is a full, clear, and exact description.

This invention consists of the combination and arrangement of a grain-table, grain-carrier, and a binding-table with an ordinary or any special "rear-cutting" mower in such manner as to be readily attached at any time for the purpose of converting a mower into a harvesting and binding machine, the said binding-table to be provided with any approved mechanism, all as hereinafter more fully described.

Reference is to be had to the accompanying drawings, forming part of this specification, in which similar letters of reference indicate corresponding parts in both the figures.

Figure 1:
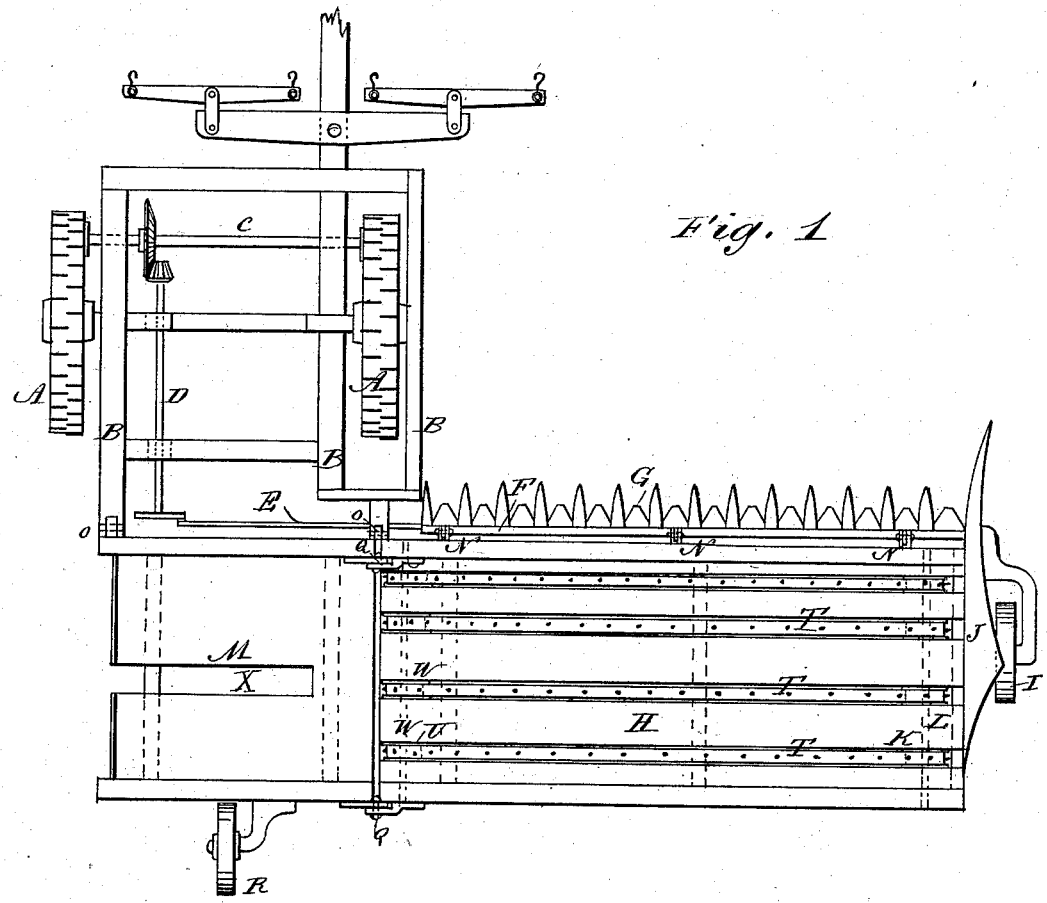
Figure 2:
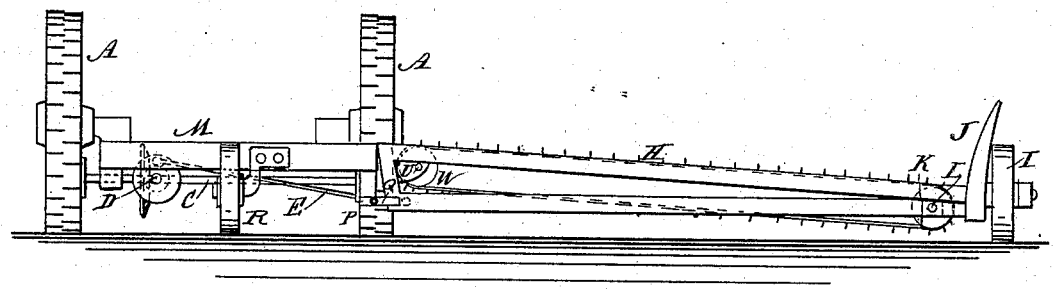

Figure 1 is a plan view of an ordinary mower with the grain-table, carrier, and binding-table applied thereto in accordance with my invention; and Fig. 2 is a rear elevation of the same.

A represents the wheels, B the frame, C the driving-shaft, D the crank-shaft, E connecting-rod, F finger-bar, and G the cutters, of an ordinary or approved mower.

H represents the grain-table, which I propose to combine with the said mower for connection thereto when the machine is to be converted into a harvester and binder, the said table being provided with a grain-wheel, I, and guard J at the outer end, and also with endless carrier-pulleys K and a shaft, L, at said end whereon the said pulleys are mounted.

M represents the platform or table, also to be applied to the mower along with the grain-table, to receive the grain therefrom and to carry the binding machinery for binding the grain. This platform M and the grain-table H are hinged together at Q in or about the same horizontal plane and in line with joint P of the cutter-bar and connecting-rod E, and the said grain-table and platform are hinged to the mower in the line of the rear of the finger-bar F, as shown by the joints N and O—N being the joints of the grain-table with the finger-bar, and O the joints of the platform with the frame B of the mowing-machine. It will be seen that by this contrivance the grain-table H and the finger-bar F, to which it is attached, have freedom to vibrate together on their respective pivots Q and P; also, that the grain-table H and the binding-table M, which are connected together at Q, are free to vibrate on their respective pivots N and O, connecting them to the finger-bar and the frame B. Now, as joints N and O are detachable, it will be apparent that so far as the grain-table, binding-table, and grain-carrier are concerned the mower of ordinary construction is made readily convertible into a reaping and binding machine, or the reverse. The said binding-platform M carries a wheel, R, at or near the rear for supporting the rear end, and it will have such connection with the driving-gear of the mower by chain, belt, or otherwise as will serve for communicating the motion to the binding apparatus over the jointed connection of it with the frame at O.

The carrier for the delivery of the grain from the grain-table H may consist of the endless belts T and a driving-shaft, U, with pulleys W at the end next to the binding-platform, and the aforesaid pulleys K and shaft L at the other end of said grain-table, or any other approved carrier adapted to receive the grain and convey it to the binding-table as it falls from the cutters. Thus any machine constructed substantially as the one here represented—that is, with the cutter-bar arranged at the rear of the truck, such as are known as "rear-cutting"—may have the binder attachment applied with but little trouble, the arrangement being such that the ordinary users of such machines may apply or remove the attachment at will.

The advantage of this improvement will be found in the saving of expense to the farmer, who will only have to provide the attachment in addition to his mower, instead of the complete harvester and binder now employed. The binding-platform will have the requisite opening X through it for such binding mechanism as requires to extend below the platform.

Having thus fully described my invention, I claim as new and desire to secure by Letters Patent—

The combination, with a rear-cut mower having a cutter-bar and pitman-rod jointed at P, of a platform, H, and binder-platform M, hinged together in line with said joint P, and jointed at N to the finger-bar and at Q to the frame B, whereby the mower may be conveniently converted into a reaper and binder, substantially as shown and described.

EDSON L. BRACKEN.

Witnesses:
T. W. BRACKEN,
W. D. BRACKEN.